United States Patent [19]

Keene et al.

[11] 4,104,211

[45] Aug. 1, 1978

[54] SEALANTS

[75] Inventors: David Edward Keene; Anthony Frederick Douglas, both of London, England

[73] Assignee: British Gas Corporation, London, England

[21] Appl. No.: 697,362

[22] Filed: Jun. 18, 1976

Related U.S. Application Data

[63] Continuation-in-part of Ser. No. 507,620, Sep. 19, 1974, abandoned.

[30] Foreign Application Priority Data

Sep. 25, 1973 [GB] United Kingdom ............ 44845/73

[51] Int. Cl.$^2$ ............................................ C08L 89/00
[52] U.S. Cl. .................... 260/8; 260/17 R; 260/17.4 CL; 260/17.4 BB; 260/23.7 M; 260/23.7 A; 260/23.7 H; 260/27 BB; 260/28.5 AS; 260/718; 260/733; 260/745; 260/755; 260/758
[58] Field of Search .................. 260/28.5 AS, 27 BB, 260/23.7 M, 23.7 A, 23.7 H, 745, 755, 758, 718, 733, 8, 17 R, 17.4 BB, 17.4 CL

[56] References Cited

U.S. PATENT DOCUMENTS

| 3,027,342 | 3/1962 | Kemp et al. ............ 260/28.5 B |
| 3,296,165 | 1/1967 | Kemp ..................... 260/28.5 B |

OTHER PUBLICATIONS

Ott et al., High Polymers (vol. 5), Cellulose (Part 2), Interscience Publ., N.Y. pp. 930, 945 and 946, (1954).

*Primary Examiner*—Melvyn I. Marquis
*Attorney, Agent, or Firm*—Larson, Taylor and Hinds

[57] ABSTRACT

This invention relates to a non-cationic bitumen and rubber in water emulsion sealant for internally sealing leakages in pipes, particularly gas mains. Sealant is applied by pressurizing the sealant into any leaks. The sealant possesses the following particular advantages:

(a) Remains in the leaks and is not drawn from the leakage path when the main is placed back into operation.
(b) Dried without cracking.
(c) Excess sealant can be easily pumped from the pipe.
(d) Stability of the emulsion.

12 Claims, No Drawings

SEALANTS

This is a continuation-in-part application of parent application Ser. No. 507,620, filed Sep. 19, 1974 and now abandoned.

This invention relates to a sealant composition. More particularly the sealant is used for sealing leaks in gas main pipe joints.

It has been found that when natural gas replaced manufactured gas problems arose with the gas flowing through the gas mains. Natural gas being dryer than manufactured gas caused moisture to evaporate from the jute packing in the joints, which are mainly of bell and spigot variety. This led to the formation of leaks owing to shrinkage of the jute packing, the leaks appearing around the edges of the packing between the walls of the pipe and the jute. Such leaks were found to be additional to any existing leaks from the pipes system caused by inadequate jute packing at the time of manufacture or assembly, together with other leaks which may have developed by movement of the joint. When the jute packing shrinks the resulting leaks are predominantly between the pipe walls and the jute. In the past the joint packings were often made impermeable to gases by the use of tarred jute and by the presence of tarry residue deposited from the manufactured gas.

Problems also arose, in the case of mechanical joints, sealed with rubber rings, because the dry natural gas caused volatile organic materials to evaporate from the rubber which had previously been swollen by the absorption of organic oily material present in manufactured gas. Loss of the absorbed material caused the rubber to shrink and created leaks between the packing and wall of the gas pipe.

Thus in both types of joint, leaks occurring through shrinkage commonly occur through gaps between the packing and the pipe.

In the past leaking joints of the jute variety in gas mains were sometimes treated with a low viscosity bitumen-in-water or rubber-in-water emulsions, stabilised with cationic surface active agents, with the intention of filling the interstices between the fibres in the shrunken jute packing with emulsion. This emulsion was applied to the joints by a method call "Fill and Drain" wherein a sealed off section of the main was flooded with the emulsion, pressurised for a period to force penetration of the emulsion into the joint and the excess material pumped or drained out. It has been found that the treatment of leaking gas mains with such a low viscosity sealant frequently failed to provide leak tight joints. There are a number of reasons for this failure which include:

1. The emulsion sealant does not penetrate effectively into the jute packing. The inability of the emulsion sealant to penetrate into the shrunken jute packing is caused by the characteristic rapid break of cationically stabilised bitumen-in-water emulsions in the presence of an absorbent material such as jute. Penetration is further hindered by the presence of strong hydrophobic tars and oily residues in the jute.
2. Extrusion of the undried sealant out of the leakage ways which can occur as a result of air or gas pressure being applied at the time of the attempted application or when the main is placed back in service.
3. Creep of the deposited thin bitumen layers from the seal.
4. Failure to fill the leak channels between the pipe wall, the shrunken jute packing and the larger gaps in inadequately packed jute joints. Additionally, this type of sealant is unsuitable for sealing dried-out mechanical joints because the sealant frequently fails to fill the gap between the shrunken rubber packing and the pipe wall.

It is an object of this invention to formulate a sealant which will substantially reduce the above disadvantages of known sealants.

According to the invention there is provided a sealant comprising a non-cationic emulsion of bitumen and rubber in water wherein the bitumen and rubber are in the disperse phase and wherein the emulsion includes a flow modifier and one or both of the following a filler material and a soluble alkali.

The composition of the invention are bitumen plus rubber based aqueous emulsions. The rubber is present either in solution in the bitumen or as an emulsion, i.e. latex. The term "bitumen" may include natural asphalt, bitumens obtained by the distillation of petroleum oil, coal tar or pitch. The composition of the invention may include any number of suitable fillers such as china clays, mica, slate dust, and asbestos and glass fibres together with colloids and water soluble polymers to modify the properties of the emulsion with regard to flow, drying and final ageing.

The emulsion has a total solids content of from 30 – 72% solids by weight, preferably about 58 – 68%.

A bitumen is of such a grade as to have a penetration value of between 12 and 450 dmm, preferably 50 to 200 dmm at 25° C, although harder and softer grades can be used. Hard grades of bitumen may be softened with a small amount of flux, i.e. kerosene, to reduce the softening temperature and facilitate emulsification.

The emulsifier can either be an anionic or non-ionic emulsifier. Typical examples of anionic emulsifiers are wood resin soaps and tall oil soaps, used at a concentration of 0.25 to 0.7% preferably up to 5% of the aqueous phase of the emulsions. Non-ionic emulsifier suitable for the preparation of bitumen-in-water emulsions are Antarox Co 880 and Antarox DM 970 (G.A.F. Great Britain Limited). Non-ionic emulsifiers should preferably have a cloud point above 100° C.

Synthetic rubbers e.g. neoprene and styrene-butadiene rubbers, or natural rubber may be included in the emulsions in proportions of from 20 – 30% by weight based on the total weight of rubber and bitumen. Preferably the rubber content should be from 20 – 30 of the total weight of rubber and bitumen. The rubber may be compounded with the bitumen by dissolving it in the bitumen prior to emulsification, by co-emulsification of rubber and bitumen or by mixing of rubber latex with a bitumen emulsion. Rubber incorporation has the benefical effect of raising the softening temperature of a given grade of bitumen and also of lowering the temperature of the brittle point. Dried sealants incorporating rubber are more ductile and less susceptible to brittle failure. The further advantage of rubber addition is that softer grade bitumen which have better adhesive properties can be employed. Rubber plus bitumen contact should be greater than 50% by weight of the total solids of the final emulsion, preferably from 70 – 98% by weight.

Colloidal stabilisers e.g. casein, and water soluble polymeric type thickners e.g. methyl cellulose, hydroxyethyl cellulose and polymers and co-polymers of acrylic acid and salts or esters of polyacrylic acid can be present in the designed concentration. The stabilisers and thickners are used to improve the stablity of emulsions to the shear effect of pumping the sealant into the gas main and maximise the re-use of the sealants in repeated fill and drain applications. They may also be used to impart the preferred flow properties to the emulsions either when used alone or in conjunction with suitable materials such as fillers e.g. bentonite clay or china clay.

Fillers such as china clay, hectorite clays such as bentonite and powered mica may be incorporated into the emulsion in amounts up to 50% by weight of the total solids and preferably from 1.5 to 30% by weight. They may be added directly to the emulsion or as dispersions in water to produce the required rheological properties. They are also added to increase the solids content of the emulsion to reduce shrinkage which occurs on drying. Fillers also increase the creep resistance of the deposited, dry sealant. Certain clays exhibit anionic emulsifying properties. They may be used to advantage since they act in a bi-functional role as both a primary emulsifier and a filler. Examples of such clays include hectorite clays such as bentonite.

In the case of emulsions made with anionic emulsifiers, fillers that produce an acid reaction when blended in the emulsion may effect the stability of the emulsion and cause it to demuslify or break.

In these cases the pH of the emulsion may be made more alkaline by the addition of alkali. Alternatively stabilizers such as those bases on oxyethylene/fatty acids e.g. Vulcastab LW (manufactured by ICI Ltd.) may be added thereby improving the shelf life of the final emulsion.

Specific sealant formulations follow which, in use, display the desired advantages, explained hereinafter. Example 1 is a non-ionic emulsion and Example 2 is an anionic emulsion.

EXAMPLE 1

| Ingredient | Quantity in parts by Weight |
|---|---|
| Bitumen, penetration number 50 (Mexphalte 50 pen. Shell-Mex and BP Ltd) | 61 |
| Antarox CO 880 (GAF Great Britain Ltd) non-ionic emulsifier | 1.5 |
| Water | 38.5 |
| A bitumen in water emulsion is prepared from the above ingredients, to which is added: | |
| Baypren Latex B58 (polychlorobutadiene despersion) | 33 |
| Devolite China Clay (English China Clay Sales Ltd) added in the form of a dispersion prepared from 65 parts devolite, 34 parts water and 1 part Antarox CO 880 | 31 |
| Discalex HV30 (Allied Colloids Ltd) | 2.8 |
| Potassium Hydroxide to adjust sealant pH to | 9.2 - 9.8 |

EXAMPLE 2

The same formulation employed in Example 1 was used except that Antarox DM 970 was employed instead of Antarox CO 880.

EXAMPLE 3

| | |
|---|---|
| Bitumen, penetration number 200 (Mexphalte 200 pen. Shell-Mex and BP Ltd) | 57 |
| Emulsifier solution made up as follows - Water | 37.6 |
| Aquarex WAQ (Du Pont Ltd) | 1.3 |
| Potassium hydroxide to adjust pH of emulsifier solution to 12.8 - 12.0 | |
| Genuine Wyoming Bentonite (Berk Chemicals) | 4.1 |
| A bitumen in water emulsion is prepared from the above ingredients to which is added: | |
| Neoprene Latex 601A (polychloroprene dispersion) (Du Pont Ltd) | 33 |

The advantage of the sealants of this invention fall into four classes:
(a)—Stability,
(b)—Flow Properties,
(c)—Drying and Curing Properties,
(d)—Properties of the fully dried seal.

These properties control the improved sealing action which characterises the sealants of the invention.

(a) Stability

The instant sealants break largely as a result of the evaporation of water. This property allows the sealant to remain stable whilst being firmly placed at the leakage site before the emulsion begins to break. The instant sealants are characterised in that final hardening does not substantially occur until air or gas flows into the pipe at the end of the sealing operation. The sealants are further characterised in that under the conditions of shear commonly encountered during applications, the emulsion remains stable so that excess emulsion can be removed, stored and reused, thereby saving costs.

(b) Flow Properties

The sealants of this invention contain the flow modifiers. The yield stress has a value between 100 and 500 dynes/cm$^2$ and is preferably above 350 dynes/cm$^2$. This range of values of yield stress is essential to the invention in two respects; firstly, it is this property which prevents the sealant flowing out of the leakage sites; secondly, the yield stress will resist flow of the sealant through leakage paths under the application of pressure eg, gas pressure, when gas is re-introduced into the main. The onset of flow through the leakage paths is governed by (i) yield stress, (ii) geometry of the leak and (iii) pressure applied. The advantage of having this value of yield stress is that the gas main can be put back into operation without the need of a separate drying stage within a very short time after application of the sealant. Yield stress at low shear rates are invariably associated with high viscosities at low rates in emulsion sealants. The sealants of this invention thin under sheat thus enabling it to be pumped into the gas main and any associated service pipes. To satisfy this rheological condition the apparent viscosity should not exceed 500 poise at a shear rate of one reciprocal second, although a preferred viscosity is about 350 poise.

Another flow characteristic of the sealant is the thixotropy of the composition. Changes in the apparent viscosity and yield stress with variation of the applied rate of shear are not instantaneous but have a certain time dependency. It is preferable that the resulting change in apparent viscosity when there is a change in the rate of the applied shear, (increasing or decreasing), should be largely complete within one minute.

(c) Drying and Curing Properties

When the sealant dries it must be sufficiently ductile and extensible to relax the shrinkage stresses during the drying period without adhesive or cohesive failure, that is, with no observable signs or loss of adhesion or splitting of the seal.

(d) Properties of the Fully Dried Seal

Failure of the seal after drying by creep, under the influence of gas pressure and gravitational forces, or failure to due to small movements of the pipes are avoided by using sealant formulations in accordance with this invention.

The method of applying the sealants of this invention by the "fill-and-drain" method in only a preferred method. Other methods can be used to apply the sealant, for example, using a "pull through" applicator which enables a "slug" of sealant to be wiped against each joint until sufficient sealant has been applied to the joint. The sealant can be applied to the joint using a pressurised "pull through" applicator.

What is claimed:

1. A sealant composition for sealing leaks in gas transmission or distribution pipes comprising an aqueous anionic or non-ionic emulsion of bitumen and rubber containing an anionic or non-ionic emulsifier in which emulsion is incorporated a flow modifier comprising a colloidal stabilizer selected from the group consisting of casein, methyl cellulose, hydroxyethyl cellulose and polymers and copolymers of acrylic acid and salts or esters of polyacrylic acid alone or in conjunction with bentonite clay or china clay and a modifier selected from the group consisting of fillers and soluble alkali wherein the rubber and bitumen content of the emulsion is at least 50% by weight of the total solids content of the sealant, the total solids content of the sealant is from 30 – 72% by weight, the apparent viscosity of the emulsion is not greater than 500 poise at a shear rate of one reciprocal second and the concentration of flow modifier is such that the yield stress of the sealant ranges from 100 to 500 dynes/cm$^2$.

2. A sealant as claimed in claim 1, wherein the disperse phase of the emulsion is a rubber latex.

3. A sealant as claimed in claim 1, wherein the disperse phase of the emulsion is a solution of rubber in bitumen.

4. A sealant as claimed in claim 1, wherein the bitumen has a penetration value of 12 450 dmm at 25° C.

5. A sealant as claimed in claim 1, wherein the rubber is selected from the group consisting of neoprene, styrenebutadiene rubber and natural rubber.

6. A sealant as claimed in claim 5, wherein the weight of rubber in the emulsion ranges from 20 – 30% by weight of the total weight of rubber and bitumen.

7. A sealant as claimed in claim 1, wherein said filler is a dispersed clay or powdered mica.

8. A sealant as claimed in claim 7, wherein said filler is present in an amount of up to 50% of the total solids.

9. A sealant as claimed in claim 1, wherein the flow modifier is selected from the group consisting of methyl cellulose, hydroxyethyl-cellulose, polyacrylic acids, esters of polyacrylic acid, salts of polyacrylic acid and co-polymers of acrylic acid.

10. A sealant as claimed in claim 1, wherein the emulsion contains an emulsifying agent.

11. As sealant as claimed in claim 10, wherein the emulsifying agent is selected from the group consisting of hectorite clays resin soaps and tall oil soaps.

12. A sealant as claimed in claim 1, wherein potassium hydroxide is employed as a soluble alkali material.

* * * * *